April 6, 1965  R. J. BERNSTEIN  3,176,593
PRESSURE RESPONSIVE SERVO VALVE
Original Filed March 13, 1961
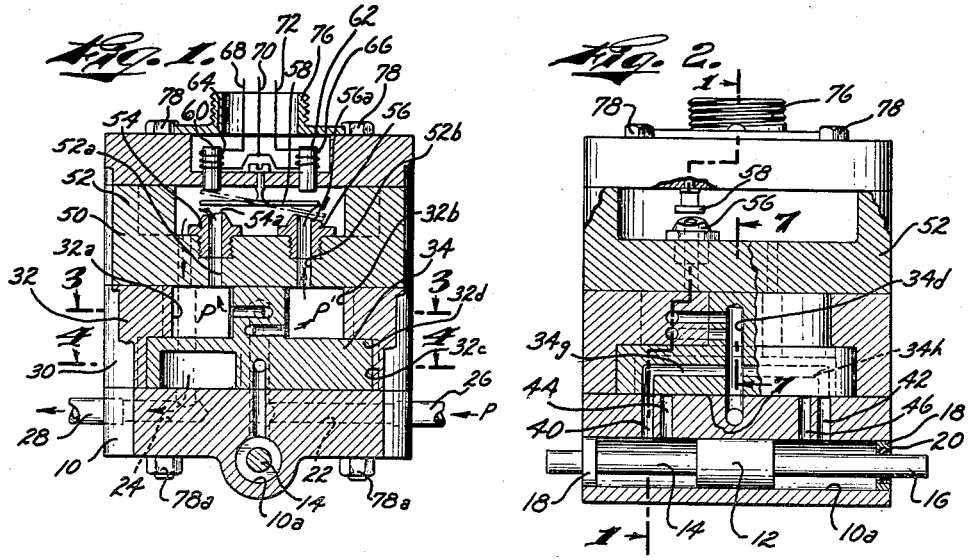
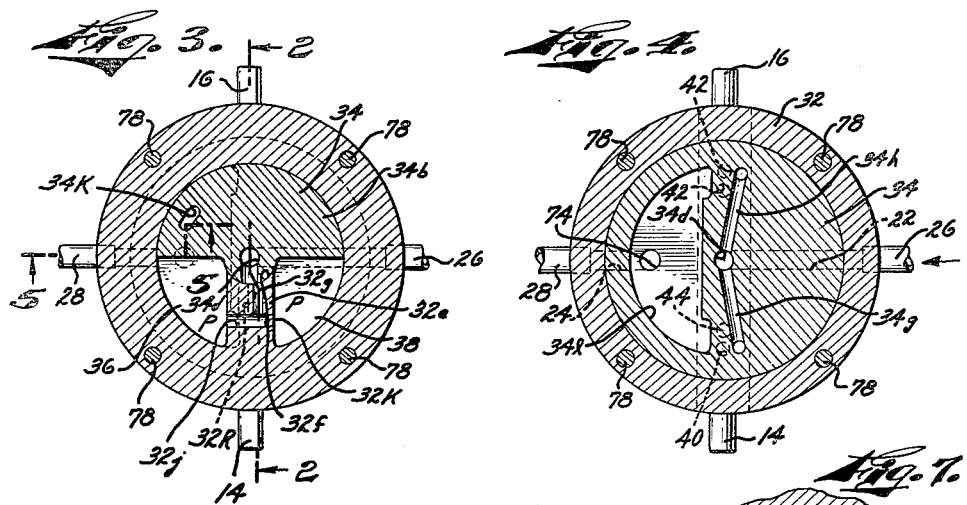
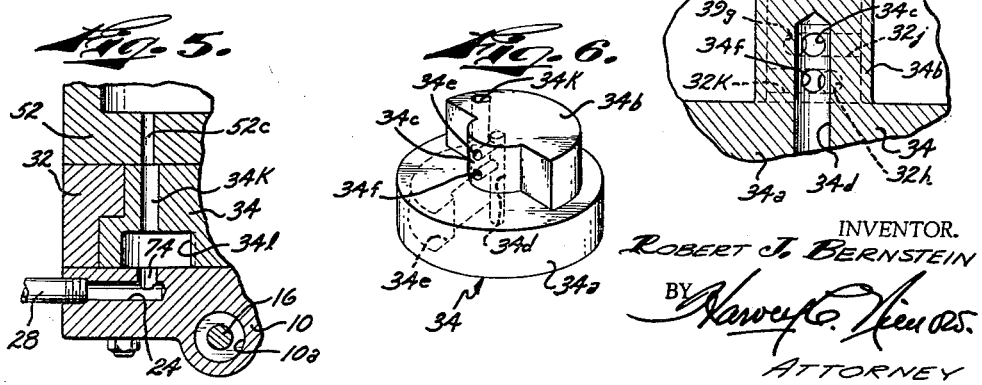
INVENTOR.
ROBERT J. BERNSTEIN
BY
ATTORNEY United States Patent Office 3,176,593
Patented Apr. 6, 1965

3,176,593
PRESSURE RESPONSIVE SERVO VALVE
Robert J. Bernstein, 10841 Danberry Drive,
Garden Grove, Calif.
Continuation of application Ser. No. 95,458, Mar. 13,
1961. This application June 21, 1962, Ser. No. 204,210
9 Claims. (Cl. 91—459)

This is a continuation of my co-pending application, Serial Number 95,458 filed March 13, 1961, for Fluid Responsive, Electro, Hydraulic, Rotary Distributor Servo Valve, now abandoned.

The present invention relates generally to servo valves, and more particularly to electroresponsive servo valves for controlling the operation of a fluid pressure responsive actuator.

In view of the many technological advances which have been made in recent years, it has become increasingly desirable to control the operation of fluid pressure responsive devices in accordance with variations in a predetermined electrical circuit. The electrical characteristics of a given circuit can be determined very precisely and can be varied in very small, precise increments. It is desirable to transfer such accuracy and precision to devices which can perform large amounts of work to thereby provide an instrumentality which not only performs considerable work but which also is very sensitive, precise and accurate in its operation.

Electroresponsive fluid pressure valves are able to control a large force in response to predetermined electrical signals. For certain applications it is desirable to have a variable or modulated fluid pressure response device such that the action of the device is variable within predetermined limits in accordance with the variations of an electrical operating signal therefor.

It is an object of the present invention to provide a modulated electroresponsive fluid flow control device.

Another object of the present invention is to provide a modulated flow control device having an electromagnetic operator.

Another object of this invention is to provide an electroresponsive servo valve.

Another object of the present invention is to provide an electroresponsive fluid flow control device as characterized above having hydraulic feedback means for effecting modulation of the device.

Another object of the present invention is to provide a flow control device as characterized above which provides a variable fluid pressure output in accordance with the electromagnetic flux created in the electromagnetic actuator.

Another object of the present invention is to provide a flow control device as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary sectional view of a hydraulic valve according to the present invention;

FIGURE 2 is a fragmentary sectional view of the device of FIGURE 1;

FIGURE 3 is a sectional view of the device taken substantially along line 3—3 of FIGURE 1;

FIGURE 4 is a sectional view taken substantially along line 4—4 of FIGURE 1;

FIGURE 5 is a fragmentary sectional view taken substantially along line 5—5 of FIGURE 3;

FIGURE 6 is a perspective view of the rotatable flow control member of the device of FIGURE 1; and FIGURE 7 is a fragmentary sectional view taken substantially along line 7—7 of FIGURE 2.

Like reference characters indicate corresponding parts throughout the several views of the drawings.

Referring to FIGURE 1 of the drawings, there is shown therein a preferred embodiment for illustration of the present invention. This embodiment comprises an actuator section 10 formed with a through opening 10a. Positioned within opening 10a is a fluid pressure responsive actuator in the form of a piston 12 which carries a pair of piston rods 14 and 16. As will hereinafter become more apparent, it is not mandatory for successful practice of the present invention that piston 12 be provided with two piston rods. Rather, only one such rod is necessary for transmitting the movement of piston 12 to other instrumentalities to be actuated thereby. Each end of opening 10a in actuator section 10 is provided with a packing ring 18 having an opening for receiving packing material 20 for sealingly engaging ring 18 and the corresponding piston rod.

Actuator section 10 is also formed with a fluid inlet 22 and a fluid outlet 24, each of which is formed with suitable fastening threads for receiving, respectively, an inlet pipe 26, from a suitable source of fluid pressure (not shown), and an outlet pipe 28.

Positioned on actuator section 10 is a rotor section 30 which includes a relatively stationary annular member 32 and a rotatable flow control member 34 positioned coaxially therewithin. Annular member 32 is formed with a large centrally located opening 32a having a reduced upper portion 32b and an enlarged lower portion 32c affording an annular shoulder 32d therebetween. Annular member 32 is also formed with fluid passage means which will be hereinafter described in detail.

Rotatable flow control member 34 is shown most clearly in FIGURE 6 of the drawings and comprises an enlarged lower portion 34a which fits within the enlarged lower portion 32c of the centrally located opening 32a in annular member 32. Flow control member 34 further comprises an upper section 34b of reduced size for fitting within the reduced upper portion 32b of the aforementioned opening 32a of member 32. Such upper portion 34b is generally semi-circular in cross section as shown most clearly in FIGURES 3 and 6.

As will hereinafter become more apparent, it is necessary for successful practice of the instant invention, that rotatable flow control member 34 be hermetically seated within, though rotatable with respect to, the relatively stationary annular member 32. That is, the outer annular or circumferential surfaces of the lower and upper sections 34a and 34b must sealingly engage the corresponding surfaces of the opening 32a in member 32.

As shown most clearly in FIGURE 3 of the drawings, annular member 32 is further formed with a radial partition wall 32e in alignment with the upper section 34b of member 34. Partition wall 32e is formed with a concave end surface 32f for sealingly engaging the arcuate surface 34c on the upper portion 34b of flow control member 34. As will hereinafter become more apparent, the convex surface 34c is formed with a constant radius from the axis of rotation of rotatable member 34 within annular member 32. The concave surface 32f on partition wall 32e is provided with the same radius to insure hermetic sealing of the surfaces 32f and 34c throughout relative movement therebetween.

It will be noted that partition wall 32e forms a pair of similarly shaped pressure chambers 36 and 38 within the reduced upper portion of the opening 32a in member 32.

Rotatable member 34 is formed with an axial passageway 34d which communicates with the inlet opening 22 in actuator section 10. A pair of vertically aligned horizontal openings 34e and 34f are also formed in member 34 to effect communication from axial opening 34d to the arcuate surface 34c formed on the upper portion 34b of member 34.

For cooperation with the openings 34e and 34f in member 34, there is provided in partition wall 32e a pair of openings 32g and 32h which are horizontally offset as shown in FIGURE 3, and which are vertically offset to facilitate alignment thereof with the openings 34e and 34f in member 34. Partition wall 32e is further formed with an opening 32j which effects communication of opening 32g with the fluid pressure chamber 36 as shown most clearly in FIGURE 3. In like fashion, there is provided an opening 32k for effecting communication between opening 32h in partition wall 32e and fluid pressure chamber 38.

The enlarged lower portion 34a of flow control member 34 is further formed with L-shaped openings 34g and 34h which afford communication from the axial inlet opening 34d to a pair of openings 40 and 42, respectively, formed in actuator section 10. Openings 40 and 42 communicate with through opening 10a in sections as will hereinafter be explained. It should be particularly noted that the L-shaped openings 34g and 34h in member 34 are not in axial alignment, but rather are radially disposed but angularly offset as shown most clearly in FIGURE 4 of the drawings. The openings 40 and 42, on the other hand, are formed in actuator section 10 in diametrically opposed relation with respect to the axis of rotation of the member 34. This relationship is most clearly shown in FIGURE 4.

Adjacent the openings 40 and 42 in section 10 are exhaust ports 44 and 46 respectively, the purpose of which will be hereinafter explained.

Immediately above the rotor section 30 is a section 50 which comprises a cup-shaped member 52 having a pair of inserts 54 and 56 each of which is formed with an angularly disposed valve seat 54a and 56a respectively. Such inserts are provided with through openings which communicate with openings 52a and 52b in member 52. The latter openings communicate with the fluid pressure chambers 36 and 38 respectively.

For controlling the flow of fluid from such chambers, there is provided a pivotal flow control member 58 which is biased to a central or intermediate position as shown in solid lines in FIGURE 1, and which is movable therefrom to alternatively cooperate with valve seats 54a and 56a for controlling the flow of fluid pressure from chambers 36 and 38 respectively.

Immediately above section 50 of the embodiment shown in the drawings, there is provided an electromagnetic actuator for valve member 58 comprising a pair of spaced pole members 60 and 62 each of which is provided with an electromagnetic winding 64 and 66 respectively. As shown by the three lead wires 68, 70 and 72, such windings are individually energizable from any suitable source of electrical power (not shown).

Valve member 58 is formed of magnetically permeable material such that energization of one or the other of the windings 64 and 66 attracts the adjacent end of portion of the pivotal flow control member 58. Thus member 58 also acts as an armature for the electromagnetic operator.

As shown most clearly in FIGURE 5 of the drawings, the pressurized fluid flows from the cup-shaped member 52 to the outlet 24 in actuator section 10 through a series of openings and cavities in members 52, 32, 34 and 10. For this purpose, a through opening 52c is provided in cup-shaped member 52. This opening registers with an oblong or elongated opening 34k formed in the rotatable flow control member 34. Such opening is elongated, as shown most clearly in FIGURE 3, to insure communication thereof with opening 52c throughout rotational movement of flow control member 34 with respect to member 52.

Opening 34k terminates in a cavity 34–1 formed in the enlarged lower portion 34a of flow control member 34 as most clearly shown in FIGURES 4, 5, and 6. Cavity 34–1 is connected to outlet opening 24 in actuator section 10 by means of an opening 74 formed in the latter. As shown most clearly in FIGURES 4 and 6, cavity 34–1 is semi-circular in shape and is provided with opposite corners which alternatively afford communication with the pairs of openings 40 and 44, and 42 and 46 formed in actuator section 10 as will hereinafter become more apparent.

On the electromagnetic upper section of the device is a fitting 76 for receiving the end of a conduit (not shown) which carries the lead wires 68, 70 and 72. The various sections of the subject servo valve are held together by four spaced bolts 78 which carry fastening nuts 78a.

The device operates generally as follows.

Pressurized fluid, which may be either a liquid or a gas, is admitted to the device through inlet opening 22. Such pressurized fluid travels from inlet 22 to the axial opening 34d, and then to the L-shaped openings 34g and 34h formed in flow control member 34. However, as shown most clearly in FIGURE 4 of the drawings, the fluid pressure within such L-shaped openings is not transmitted to the piston 12 within opening 10a due to the fact that such L-shaped openings are not aligned with either of the openings 40 and 42 formed in actuator section 10.

The fluid pressure within axial opening 34d is admitted to each of the fluid chambers 36 and 38. Such fluid is admitted to chamber 36 through opening 34e in the upper section 34b of flow control member 34 and the openings 32g and 32j formed in the partition wall 32e of annular member 32. In like fashion, fluid pressure is admitted to chamber 38 through opening 34f in member 34, and the openings 32h and 32k formed in partition wall 32e.

The fluid under pressure within chamber 36 flows through opening 52a and the opening in fitting 54 to the cup-shaped interior of member 52. In like fashion, the fluid under pressure within chamber 38 flows through opening 52b and the opening within fitting 56 into the interior of member 52. Such fluid then flows through opening 52c, elongated opening 34k, cavity 34–1, and opening 74 to the outlet 24 formed in actuator section 10. Thus there is a continuous flow of pressurized fluid from the inlet 22 to the outlet 24 of the subject device.

As one or the other of the electromagnetic windings 64 and 66 is energized the following sequence takes place.

Upon energization of winding 64 the pivotal armature—flow control member 58 is attracted to magnetic core member 60 and thus assumes the position generally shown in broken lines in FIGURE 1. As such, the fluid flow from chamber 38 is restricted whereupon the pressure therein is permitted to increase. This causes a pressure differential to exist between the chambers 36 and 38 so as to cause the flow control member 34 to rotate in a counterclockwise direction as shown in FIGURE 3.

Such movement of flow control member 34 causes the L-shaped opening 34h in member 34 to be aligned with the opening 42 formed in the actuator section 10 of the device. This causes the fluid under pressure from the inlet 22 to flow through opening 34a and opening 42 to the right hand side of piston 12 as shown in FIGURE 2. At the same time, the aforementioned rotational movement of flow control member 34 causes cavity 34–1 in the lower portion of member 34 to afford communication of the openings 40 and 44 with the outlet 24 in actuator section 10. Thus, as fluid pressure is applied to the right hand side of piston 12 (FIGURE 2) the left hand side thereof is exhausted through openings 40 and 44, cavity 34-1, opening 74 and outlet 24. Thus piston 12 is moved to the left.

As flow control member 34 moves in a counterclockwise direction as above explained, the pressure within chamber 36 is increased and the pressure within chamber 38 is decreased due to movement of openings 34e and 34f in valve member 34 with respect to openings 32g and 32h in partition wall 32e. That is, as member 34 rotates in a counterclockwise direction as shown in FIGURE 3, the opening 34e is caused to more completely align itself with opening 32g in partition wall 32e, as distinguished from the partial alignment therebetween which previously existed. In similar fashion such movement of member 34 causes opening 34f to be moved further out of alignment with opening 32h in partition wall 32e. Thus, since each of the chambers 36 and 38 receives fluid pressure from axial opening 34d it is seen that such movement of valve member 34 increases the flow of pressurized fluid to chamber 36 and decreases such flow to chamber 38. This continues until the previous pressure differential between chambers 36 and 38 is eliminated, the pressures therewithin thereby being equalized and the valve member 34 being brought to rest in the corresponding position.

In the event winding 66 is energized rather than winding 64 as above explained, the reverse sequence of events takes place so that pressure is applied to the left hand side of piston 12 to move the same to the right. It is contemplated that the movement of piston 12 and corresponding movement of piston rods 14 and 16 can be transmitted to any appropriate device. Further, it is contemplated that the movement of such piston rods can be associated with the electrical circuit for energizing electromagnetic windings 64 and 66 to provide a further feedback circuit to the subject servo valve.

It is contemplated that by selecting the proper biasing means for flow control armature member 58, it is possible to modulate the restriction of fluid flow from said chambers 36 and 38. That is, by varying the amount of energization of the particular one of the windings 64 and 66, it is possible to modulate the flow of fluid from the corresponding chamber such as to control the differential pressure between chambers 36 and 38 to substantially any value within predetermined limits.

Due to the corresponding variations in the pressure drop across the cooperating openings 34e and 32g, and the openings 34f and 32h, and also due to the variations in the pressure drop between the cooperating openings 34g and 40, and openings 34h and 42, it is contemplated that the fluid pressure afforded to the opening 10a in actuator section 10 can be modulated in accordance with an amount of energization of the electromagnetic windings 64 and 66.

It is thus seen that the present invention provides a servo valve which is responsive to predetermined variations in electrical energy applied thereto.

Although I have shown and described certain specific embodiments of my invention, I am fully aware that many modifications thereof are possible. My invention therefore, is not to be restricted except insofar as is necessitated by the prior art and by the spirit of the appended claims.

I claim:

1. A fluid pressure servo valve comprising in combination, a housing having fluid passageways for connection with pressure responsive means, a flow control member rotatably mounted on said housing forming a pair of separated fluid chambers therewith and having means controlling fluid flow through said passageways, separate passage means formed in said housing affording fluid flow through said chambers, and condition responsive means in said passage means for varying the pressure differential in said chambers to thereby cause said flow control member to vary accordingly the fluid flow through said passageways, said flow control member being formed with a flow control opening for each of said passage means to cooperate respectively therewith to inversely vary fluid flow to said chambers upon rotation of said flow control member.

2. A fluid pressure servo valve comprising in combination, a housing having fluid passageways for connection with pressure responsive means, a flow control member rotatably mounted on said housing forming a pair of fluid chambers therewith and having means controlling fluid flow through said passageways, separate passage means formed in said housing affording fluid flow through said chambers, and electroresponsive valve means in said passage means for varying the pressure differential in said chambers to thereby cause said flow control member to rotate to vary accordingly the fluid flow through said passageways, said flow control member being formed with a flow control opening for each of said passage means to cooperate respectively therewith to inversely vary fluid flow to said chambers upon rotation of said flow control member.

3. A fluid pressure servo valve according to claim 2 wherein said electroresponsive valve means comprises electromagnetic actuating means and an armature-valve member for varying the flow of fluid through one of said chambers in response to energization of said actuating means.

4. A fluid pressure servo valve comprising in combination, a housing having fluid passageways for connection with pressure responsive means, a flow control member rotatably mounted on said housing forming a pair of separated fluid chambers therewith and having means controlling fluid flow through said passageways, separate passage means formed in said housing affording fluid flow through said chambers, and condition responsive means in said passage means for varying the pressure differential in said chambers to thereby cause said flow control member to rotate to simultaneously vary fluid flow through said passageways, said flow control member being formed with a flow control opening for each of said passage means to cooperate respectively therewith to inversely vary fluid flow to said chambers upon rotation of said flow control member to effect equalization of the fluid pressure in said chambers.

5. A fluid pressure servo valve comprising in combination, a housing having fluid passageways for connection with pressure responsive means and formed with a cavity and a stationary partition wall therein, a flow control member rotatably mounted in said cavity and cooperating with said partition wall to form a pair of separated fluid chambers therewith and having means controlling fluid flow through said passageways, separate passage means formed in said housing affording fluid flow through said chambers, and an electromagnetic actuator having an armature member positioned for flow controlling operation in said passage means in response to energization of said actuator to thereby effect a pressure differential in said chambers so as to cause said flow control member to rotate to simultaneously vary fluid flow through said passageways, said flow control member being formed with a flow control opening for each of said passage means to cooperate respectively therewith to inversely vary fluid flow to said chambers upon rotation of said flow control member to effect equalization of the fluid pressure in said chambers at a predetermined flow of fluid through said passageways.

6. A fluid pressure servo valve comprising in combination, a housing formed with an opening and a pair of fluid passageways independently communicating therewith, a pressure responsive member movably mounted in said opening for movement in opposite directions in accordance with flow of fluid pressure through said passageways, said housing being formed with a cavity and a stationary partition wall therein, a flow control member rotatably mounted within said cavity and co-operating with said partition wall to form a pair of separated fluid chambers therewith and having means controlling fluid flow through said passageways, said housing being formed with individual passage means affording individual fluid flow through said chambers, a source of fluid pressure for connection to said passageways and said passage means, and condition responsive means in said passage means for individually controlling the rate of fluid flow through said chambers to thereby create a pressure difference therebetween, said pressure difference causing said flow control member to rotate to vary the flow of fluid pressure through said passageways and said passage means, said flow control member being formed with a pair of flow control openings for separate variable alignment with said passage means, said flow control openings being inversely operable with respect to their respective passage means upon rotation of said control member in controlling fluid flow to said chambers whereby said flow control member affords fluid flow from said source to said pressure responsive member and varies the fluid pressure in said chambers until said pressure difference therebetween is eliminated.

7. A fluid pressure servo valve according to claim 6 wherein said condition responsive means is operable to provide any pressure difference between said chambers within predetermined limits to thereby cause said control member to provide corresponding variation in the fluid pressure to said pressure responsive member.

8. A fluid pressure servo valve according to claim 7 wherein said condition responsive means is electroresponsive whereby the fluid pressure applied to said pressure responsive member varies in accordance with energization of said condition responsive means.

9. A fluid pressure servo valve comprising in combination, a housing formed with an opening and a pair of fluid passageways independently communicating therewith, a pressure responsive piston rectilinearly moveable within said opening for movement in opposite directions in accordance with flow of fluid pressure through said passageways, said housing being formed with a cavity and a stationary partition wall therein, a flow control member rotatably mounted within said cavity and cooperating with said partition wall to form a pair of separated fluid chambers therewith and having means controlling fluid flow through said passageways, said housing being formed with separate passage means affording individual fluid flow through said chambers, a source of fluid pressure connected to said passageways and said passage means, and condition responsive means in said passage means for individually controlling the rate of fluid flow through said chambers to thereby create a pressure difference therebetween, said pressure difference causing said flow control member to rotate to vary the flow of fluid pressure through said passageways and said passage means, said flow control member being formed with a pair of flow control openings for separate variable alignment with said passage means, said flow control openings being inversely operable with respect to their respective passage means upon rotation of said control member in controlling fluid flow to said chambers, whereby said flow control member affords fluid flow from said source to said pressure responsive member and varies the fluid pressure in said chambers until said pressure difference therebetween is eliminated.

References Cited by the Examiner

UNITED STATES PATENTS

| | | | |
|---|---|---|---|
| 1,032,344 | 7/12 | Purpura | 91—310 |
| 2,020,847 | 11/35 | Mitereff | 91—51 |
| 2,709,421 | 5/55 | Avery | 91—51 |
| 2,832,365 | 4/58 | Smith | 91—51 |
| 2,835,265 | 5/58 | Brandstadter | 91—51 |
| 2,972,338 | 2/61 | Lloyd | 137—625.62 |
| 3,063,422 | 11/62 | Gregowski | 91—51 |

SAMUEL LEVINE, *Primary Examiner.*